United States Patent [19]

Yamaoka

[11] Patent Number: 5,242,038
[45] Date of Patent: Sep. 7, 1993

[54] VARIABLE DAMPING FORCE SHOCK ABSORBER

[75] Inventor: Fumiyuki Yamaoka, Kanagawa, Japan

[73] Assignee: Atsugi Unisia Corporation, Atsugi, Japan

[21] Appl. No.: 706,274

[22] Filed: May 28, 1991

[30] Foreign Application Priority Data

May 28, 1990 [JP] Japan .................. 2-137366

[51] Int. Cl.⁵ .............................. F16F 9/00
[52] U.S. Cl. ...................... 188/322.15; 188/299; 188/319; 188/285
[58] Field of Search ............... 188/282, 285, 299, 319, 188/322.15

[56] References Cited

U.S. PATENT DOCUMENTS

| | | |
|---|---|---|
| 4,159,756 | 7/1979 | Murakami et al. ............ 188/319 |
| 4,754,855 | 7/1988 | Kuwana et al. ............ 188/319 X |
| 4,821,851 | 4/1989 | Kruckemeier et al. ............ 188/319 |
| 4,826,207 | 5/1989 | Yoshioka et al. ............ 188/319 X |
| 4,905,799 | 3/1990 | Yamaoka et al. ............ 188/322.15 |
| 4,953,671 | 9/1990 | Imaizumi ............ 188/322.15 X |
| 4,964,493 | 10/1990 | Yamaura et al. ............ 188/322.15 |
| 5,044,474 | 9/1991 | de Kock ............ 188/319 |

FOREIGN PATENT DOCUMENTS

| | | |
|---|---|---|
| 4019221A1 | 1/1991 | Fed. Rep. of Germany . |
| 4022688A1 | 3/1991 | Fed. Rep. of Germany . |
| 58-92537 | 6/1983 | Japan . |
| 8707565 | 12/1987 | PCT Int'l Appl. . |
| 2126687 | 3/1984 | United Kingdom . |
| 2220726 | 1/1990 | United Kingdom . |
| 2234038 | 1/1991 | United Kingdom ........... 188/322.15 |
| 2234572 | 2/1991 | United Kingdom ............... 188/319 |
| 2236574 | 4/1991 | United Kingdom ............... 188/319 |
| 2241044 | 8/1991 | United Kingdom ............... 188/299 |

Primary Examiner—Robert J. Oberleitner
Assistant Examiner—Josie A. Ballato
Attorney, Agent, or Firm—Bachman & LaPointe

[57] ABSTRACT

A variable damping force shock absorber comprises a pressure cylinder forming a working chamber having first and second portions operable to store damping field. A valve is provided to control a first flow of damping fluid between said first and second portions of said working chamber during compression or rebound of the shock absorber. A bypass passageway is in fluid communication with the first and second portions of the working chamber. An angularly adjustable flow restrictor is provided for regulating a second flow of damping fluid through the bypass passageway. A pressure chamber is in fluid communication with the first (or the second portion) of the working chamber and the valve. The flow restrictor is operable to regulate also a third flow of damping fluid displaced out of the pressure chamber.

1 Claim, 5 Drawing Sheets

FIG. 4
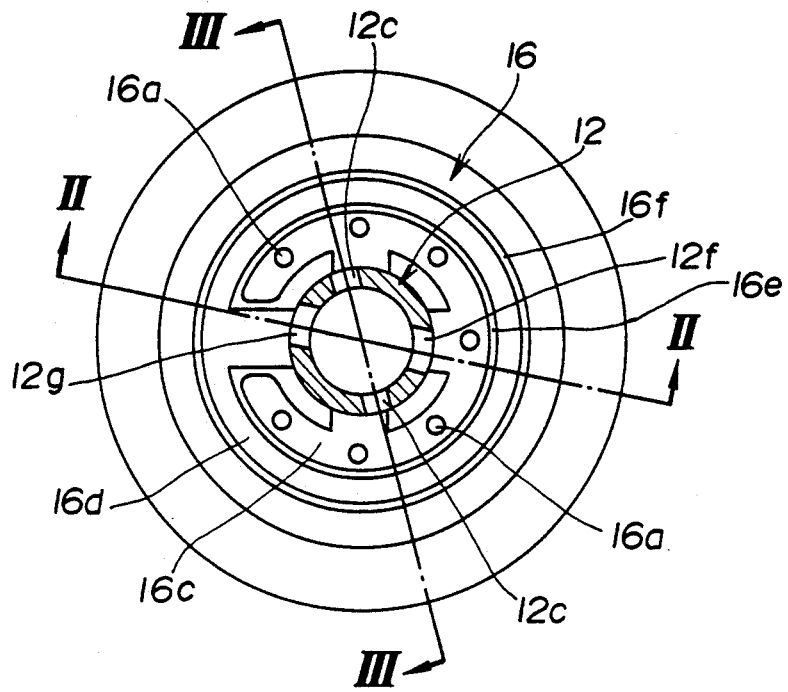
FIG. 5      FIG. 6      FIG. 7
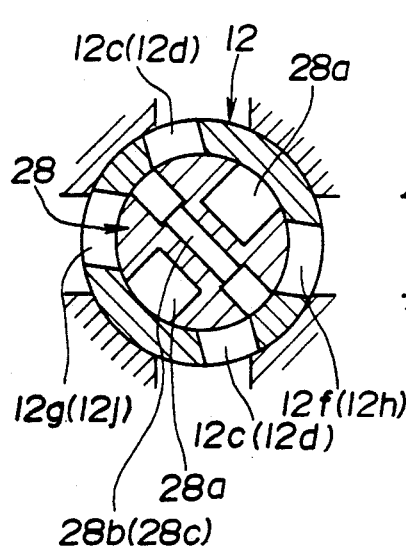  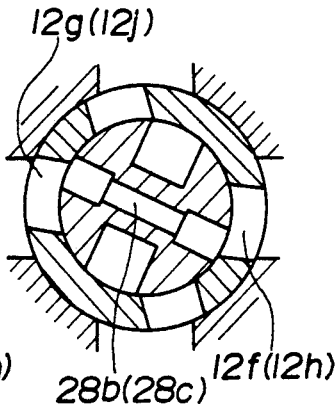  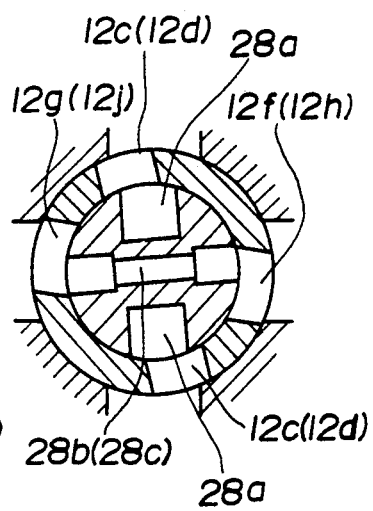

VARIABLE DAMPING FORCE SHOCK ABSORBER

RELATED APPLICATION

U.S. Pat. application Ser. No. 07/536,771 filed on Jun. 12, 1990 now U.S. Pat. No. 5,133,434.

This U.S. Patent application corresponds to German Patent application No. P 40 19 221 and U.S. Kingdom patent application No. 9013477.6, now published as GB 2 234 038 A.

BACKGROUND OF THE INVENTION

The present invention relates to a variable damping force shock absorber.

Variable damping force shock absorbers are well known. Japanese Utility Model First (unexamined Publication No. 58-92537 discloses a variable damping force shock absorber. This known shock absorber comprises a pressure cylinder forming working chamber having first and second portions to store damping fluid. The absorber further comprises a first control valve for controlling the flow of damping fluid between the first and second portions of the working chamber during compression of the shock absorber. A second control valve is further provided for controlling the flow of damping fluid between the first and second portions of the working chamber during rebound of the shock absorber. A bypass passage has a port opening to the first portion and a valve port opening to the second portion. An externally controllable valve is provided to open or close the valve port. This externally controllable valve is adjusted to selectively change the damping characteristics of the shock absorber. The damping characteristics of this known shock absorber are not satisfactory since there is a point of inflection if a damping force characteristic curve is drawn.

An object of the present invention is to provide a variable damping force shock absorber which provides the damping characteristics without any point of inflection nor at least any noticeable point of inflection.

SUMMARY OF THE INVENTION

According to the present invention, a variable damping force shock absorber is provided with:

a sleeve having an axial bore, a valve body fixedly coupled with said sleeve, said valve body being formed with an outer groove, an inner groove surrounded by said outer groove, and outer valve seat disposed adjacent the outer periphery of said outer groove, an inner valve seat disposed between sad outer and inner grooves;

a damping valve element cooperating with said outer and inner valve seats to cover said outer and inner grooves;

said sleeve having a first radial port communicating with said inner groove, a second radial port communication with said outer groove, a third radial port communicating with said inner groove;

an adjustable flow restrictor moveably disposed in said axial bore of said sleeve and having a first passage and a second passage, said adjustable flow restrictor having a first position wherein said first and second passages are out of communication with said first, second and third radial ports, thereby to cover said first, second and third radial ports, a second position wherein said first passage establishes a fluid communication between said first and second radial ports, thereby to establish fluid communication between said inner groove and said outer groove, and a third position wherein said second passage communicates with said third port.

BRIEF DESCRIPTION OF THE DRAWINGS

FIG. 4 is a cross section taken through the line IV—IV of FIG. 2 with unnecessary part removed to clearly illustrate positional relationship between ports, FIGS. 5, 6 and 7 illustrate three typical angular positions of a rotary valve.

DETAILED DESCRIPTION OF THE INVENTION

Figure 1:
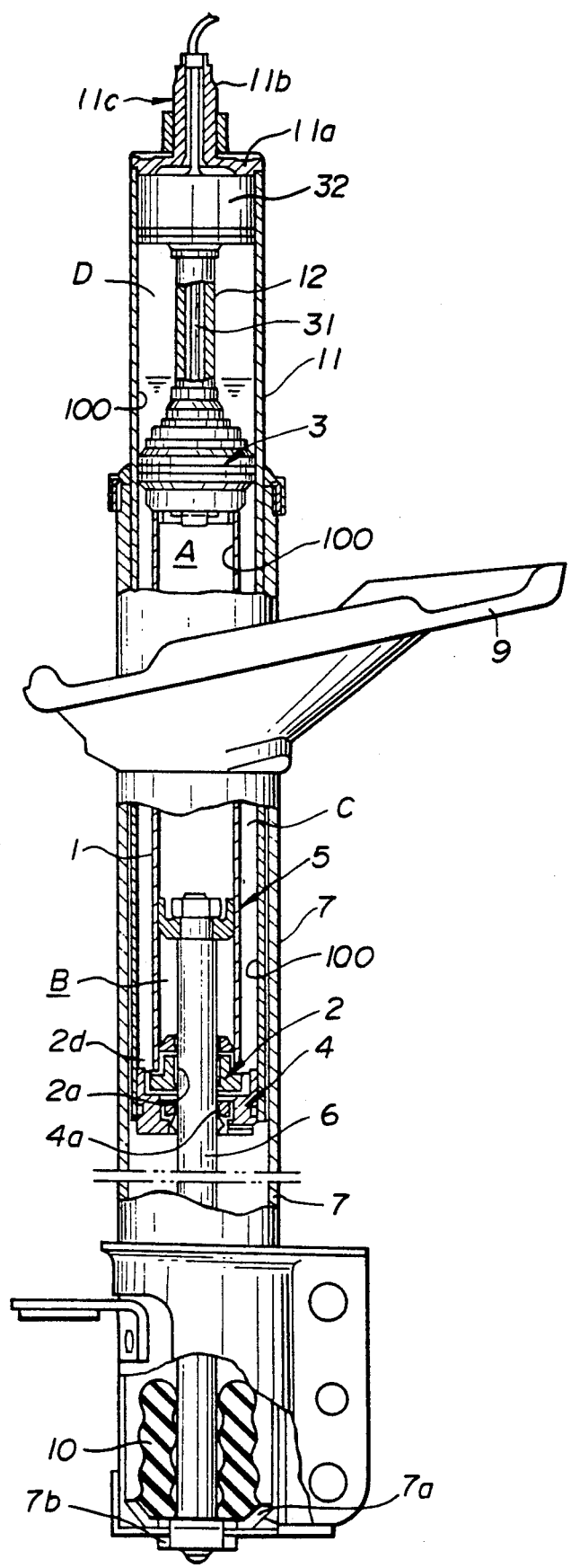
FIG. 1 is a side elevational view, partly broken away, of an embodiment of a variable damping force shock absorber according to the present invention.

Referring to FIG. 1, a first embodiment of a variable damping force shock absorber according to the present invention is described. The shock absorber comprises an elongated tubular pressure cylinder 11 defining a damping fluid containing working chamber 100. Disposed within the working chamber 100 is an inner tubular cylinder 1. Disposed within the inner cylinder 1 is a reciprocal piston 5. A piston rod 6 extends through a guide member 2 closing one end of the inner cylinder 1, and a dirt shield 7. The piston rod 6 is fixedly secured to a bottom plate 7a of the dirt shield 7 by means of a nut 7b. The cylinder 11 is connected to a body of a vehicle, while the dirt shield 7 is connected to a wheel axle assembly of the vehicle.

The guide member 2 is formed with a through axial bore 2a for allowing extension of the piston rod 6 and closes a lower end, viewing in FIG. 1, of the inner cylinder 1. The inner cylinder 1 has an upper end, viewing in FIG. 1, provided with a base 3 which will be later described. The inner cylinder tube 1 is filled with damping fluid and divided by the piston 5 into an upper chamber A and a lower chamber B, viewing in FIG. 1. The guide member 2 has a real retainer 4 for carrying an oil seal 4a sealably engaging the piston rod 6. The seal retainer 4 is threadably and sealably engaging a lower open end, viewing in FIG. 1, of the cylinder 11 to close the lower open end thereof. The cylinder 11 extends upwardly further than the inner cylinder 1 does. The outer cylinder 11 has an upper open end, viewing in FIG. 1, closed by a lid 11a integral with an attachment 11c with an external thread which is used for mounting the shock absorber to the vehicle body. An actuator 32 is fixedly disposed in the outer cylinder tube 11 near the lid and connected to the base 3 via a control rod 31 extending through a support sleeve 12.

The dirt shield 7 is provided with a bound stop rubber 15 at the bottom plate 7a thereof. The shield 7 also has a lower spring seat 9 for bearing a lower end of a suspension spring, not shown. Defined between the cylinder 1 and 11 is an annular outer chamber C. The annular outer chamber C has a lower end portion, viewing in FIG. 1, communicating with the lower chamber B via the guide member 2 and an upper end portion, viewing in FIG. 1, communicable with the upper chamber A under the control of the base 3. Between the base 3 and the actuator 32 is defined a reservoir for damping fluid pressurized with a confined gas.

Figure 2:
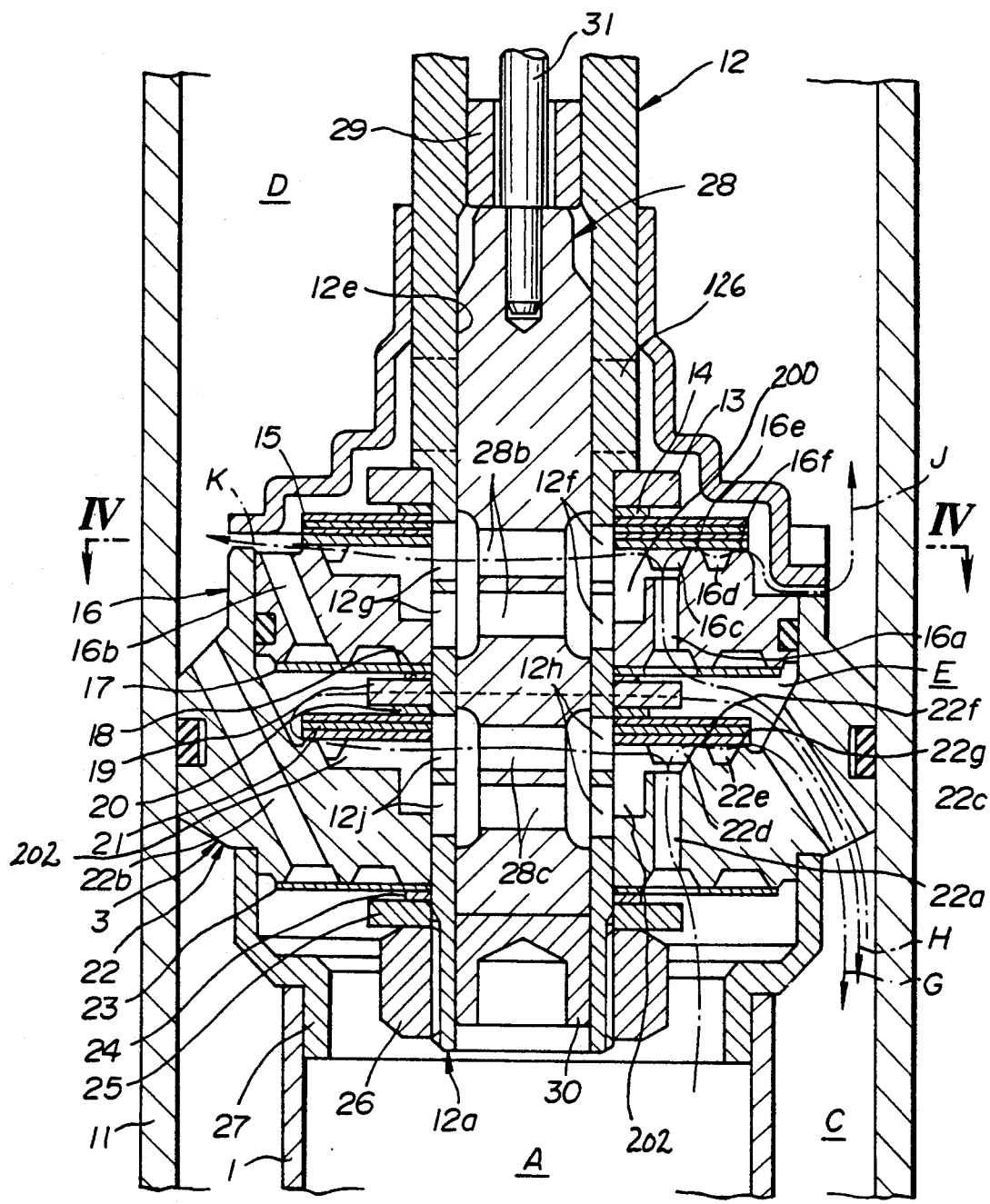
FIG. 2 is an enlarged longitudinal cross section taken along the line II—II of FIG. 4.
Figure 3:
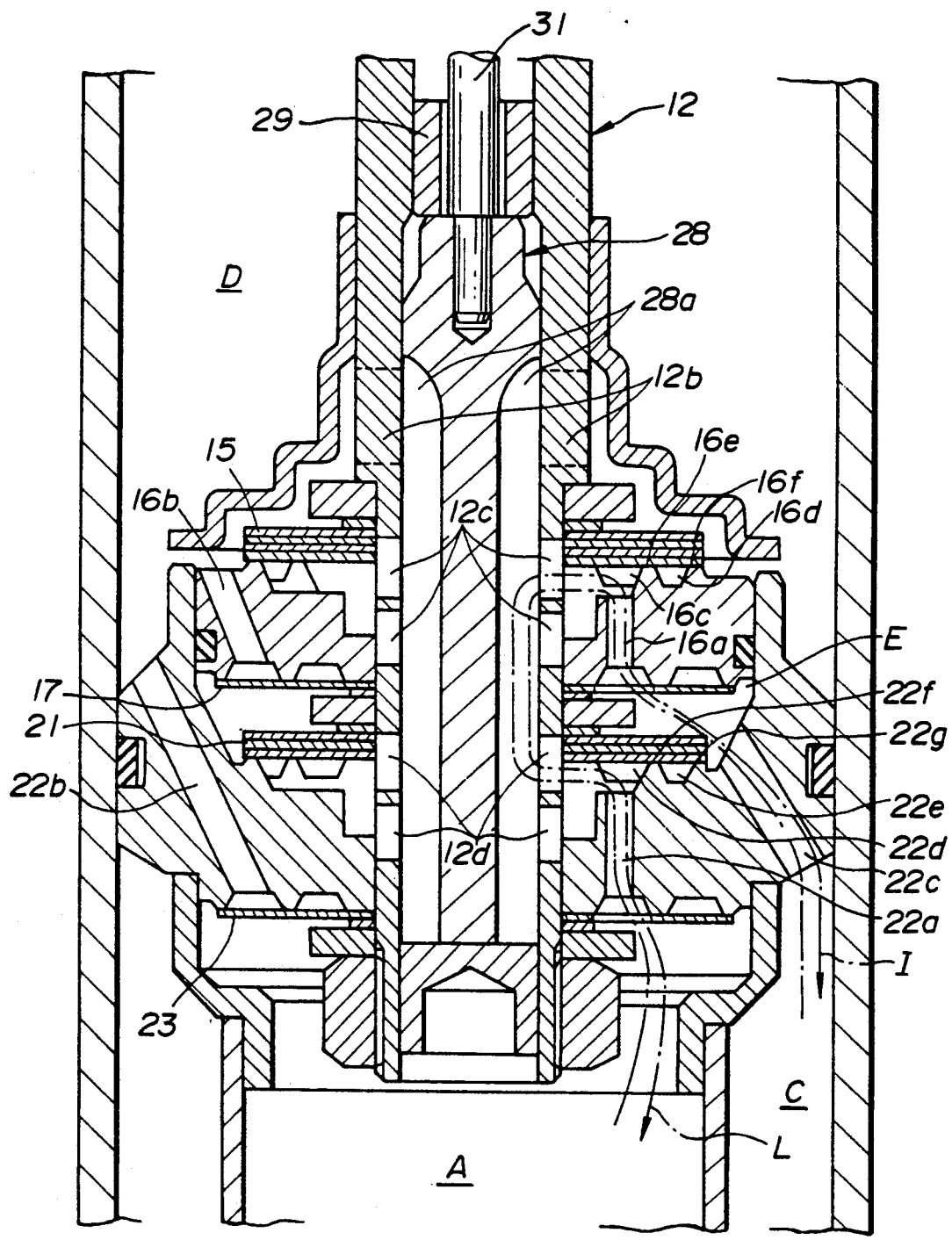
FIG. 3 is an enlarged longitudinal cross section taken along the line III—III of FIG. 4.

Referring to FIGS. 2 and 3, the support sleeve 12 has a reduced diameter end portion 12a with a shoulder. Abutting on this shoulder is a retainer 13. Between this retainer 13 and a retainer 25 on a nut 26 threadably engaged with the reduced diameter and portion 12a are main components of the base 3. The base 3 comprises first and second bodies 22 and 16 defining therebetween a chamber E. This pressure chamber E is in fluid communication with a second portion, i.e., the chamber C, of the working chamber 100 via a passage 22c formed through the first body 22.

As best seen in FIG. 4, the second body 16 is formed with a coaxial inner and outer ring grooves 16c and 16d. The inner groove 16c is not continuous and is partially open radially and inwardly. Provided between the grooves 16c and 16d is an inner valve seat 16e and provided near the outer periphery of the outer ring groove 16d is an outer valve seat 16f. These valve seats 16e and 16f cooperate with a deflectable valve element to form a second damping valve 15. Similarly, the first body 22 is formed with coaxial inner and outer grooves 22d and 22e. The inner groove 22d is not continuous and partially open radially and inwardly. Provided between the grooves 22d and 22e is an inner valve seat 22f and provided near the outer periphery of the outer ring groove 22e is an outer valve seat 22g. These valve seats 22f and 22g cooperate with a deflectable valve element to form a first damping valve 21.

The first body 22 is sealably engaged with the inner wall of the cylinder 11 to separate the chambers C and D from each other. The second body 16 is sealably received by the first body 22 to separate the chambers D and E from each other. A coupling sleeve 27 interconnects the bottom portion of the first body 22 and the top portion of the inner cylinder 1 to separate the chambers A and C from each other. A first check valve 23 is provided in fluid communication with the chamber A, and a passage 22b is formed through the first body 22 in fluid communication with the chamber D and the first check valve 23. With t his check valve 23, there occurs a one-way flow of damping fluid through the passage 22b from the chamber D to the chamber A if a pressure drop occurs in the chamber A. Similarly, a second check valve 17 is provided in fluid communication with the chamber E, and a passage 16b is formed through the second body 16 in fluid communication with the chamber D and the second check valve 17. With this check valve 17, there occurs a one-way flow of damping fluid through the passage 16b from the chamber D to the chamber E and in turn to the chamber C if a pressure drop occurs in the chamber C.

In FIGS. 2 and 3, reference numerals 14, 18, 20 and 24 designate washers, and the reference numeral 19a retainer.

As will be readily seen from FIG. 4, there is a pressure chamber 200 defines by the inner groove 16c, the inner valve seat 16e, the reduced diameter end portion 12a of the support sleeve 12 and the second damping valve 15. This pressure chamber 200 is in fluid communication, via ports 16a of the second body 16, chamber E and passage 22c, with a second portion, i.e., the chamber C, of the working chamber 100. The pressure chamber 200 is in fluid communication with the second damping valve 15. Similarly, there is a pressure chamber 202 defined by the inner groove 22d, the inner valve seat 22f, the reduced diameter end portion 12a of the support sleeve 12 and the first damping valve 21. This pressure chamber 202 is in fluid communication, via ports 22a of the first body 22, with a first portion, i.e., the chamber A, of the working chamber 100. The pressure chamber 202 is in fluid communication with the first damping valve 21.

Rotatably disposed within an axial bore 12e of the support sleeve 12 is an angularly adjustable flow restrictor 28. The flow restrictor 28 is supported by two thrust bushings 29 and 30. As best seen in FIGS. 3 and 4, the support sleeve 12 is formed with two pairs of diametrically opposed upper radial ports 12c in fluid communication with the pressure chamber 200 of the second damping valve 15. It is also formed with another two pairs of diametrically opposed lower radial ports 12d in fluid communication with the pressure chamber 202 of the first damping valve 21. In addition, the sleeve 12 is also formed with a pair of diametrically opposed radial ports 12b in fluid communication with the chamber D. As readily seen from FIG. 3, the two of the radial ports 12c are in axial alignment with two of the radial ports 12d, while the other two end other former in alignment with the other two of the latter. The flow restrictor 28 is formed with two diametrically opposed axial transfer passages 28a for regulating a fluid flow communication between the mating radial ports 12c and 12d. From the preceding description, it will be appreciated that there is established a bypass passageway by the radial ports 12c, 12d and the axial transfer passages 28a when the axial transfer passages 28a are in communication with the radial ports 12c and 12d. This bypass passageway provides a fluid communication between the first portion, i.e., the chamber A, of the working chamber 100 and the second portion, i.e., the chamber C, of the working chamber 100 (see phantom lines arrows I and L).

Referring to FIGS. 2 and 4, the support sleeve 12 is formed with two pairs of diametrically opposed upper radial ports 12f and 12g. As best seen in FIG. 4, two radial ports 12f are in fluid communication with the pressure chamber 200 of the second damping valve 15, while the other two radial ports 12g are in fluid communication with the annular groove 16d. In addition, the support sleeve 12 is formed with two pairs of diametrically opposed lower radial ports 12h and 12j. Similarly, two radial ports 12h are in fluid communication with the pressure chamber 222 of the first damping valve 21, while the other two radial ports 12j are in fluid communication with the annular groove 22e. The radial ports 12f and 12h are in axial alignment with each other, and thus the radial ports 12g in axial alignment with each other. The flow restrictor 28 is also formed with two upper radial transfer passage 28b for regulating a fluid flow communication between the mating radial ports 12f and 12g. It is also formed with two lower radial transfer passages 28c for regulating a fluid flow communication between the mating radial ports 12h and 12j.

Under the control of the actuator 32, the flow restrictor 28 is angularly adjustable to any one of angular positions including three positions as illustrated in FIGS. 5, 6 and 7. FIG. 5 shows the closed position in which there is no flow of damping fluid through the axial transfer passages 20a since the ports 12c and 12d are out of alignment with the axial transfer passage 28a, and there are closed flow paths (see arrows K and H in FIG. 2) which allow flows of fluid out of the pressure chambers 200 and 202 toward their outer ring grooves 16d and 23e since the radial ports 12f and 12g are out of alignment with the radial transfer passages 28b and the radial ports 12h and 12j out of alignment with the radial transfer passages 28c. Viewing in FIGS. 5, 6 and 7, turning the flow restrictor 28 counterclockwise to the position as illustrated in FIG. 6, there is a flow of damping fluid through each of the radial transfer passages 28b and 28c and a flow of damping fluid through each of the axial transfer passages is about to begin. Turning further counterclockwise causes an increase in flow of damping fluid through each of the axial transfer passages 28a. FIG. 7 illustrates a position where there are maximum fluid flows of damping fluid through each of the axial transfer passages 28a and each of the axial transfer 28 b and 28c. From this description in connection with FIGS. 5, 6 and 7, it will be appreciated that the flow restrictor 28 is operable to selectively change a ratio between a flow sectional area of the flow of damping fluid through the radial transfer passage and that through the axial transfer passage.

Referring to FIGS. 2 and 3, during rebound of the shock absorber, the second damping valve 15 controls a first flow of damping fluid (see a phantom line drawn arrow J in FIG. 2) from the second portion, i.e., the chamber C, of the working chamber 100 toward the second portion, i.e., the chamber D, of the working chamber 100, the flow restrictor 28 regulates a second flow of damping fluid (see a phantom line drawn arrow L in FIG. 3) through the bypass passageway, and the flow restrictor 28 also regulates a third flow of damping fluid (see a phantom line drawn arrow K in FIG. 2) out of the pressure chambers 200 and 202 toward the first portion, i.e., the chamber D, of the working chamber 100. During compression of the shock absorber, the first damping valve 21 controls a first flow of damping fluid (see a phantom line drawn arrow G in FIG. 2), the flow restrictor 28 regulates a second flow of damping fluid (see phantom line drawn arrow I in FIG. 3) through the bypass passageway, and the flow restrictor 28 also regulates a third flow of damping fluid (see a phantom line drawn arrow H in FIG. 2).

Figure 8:
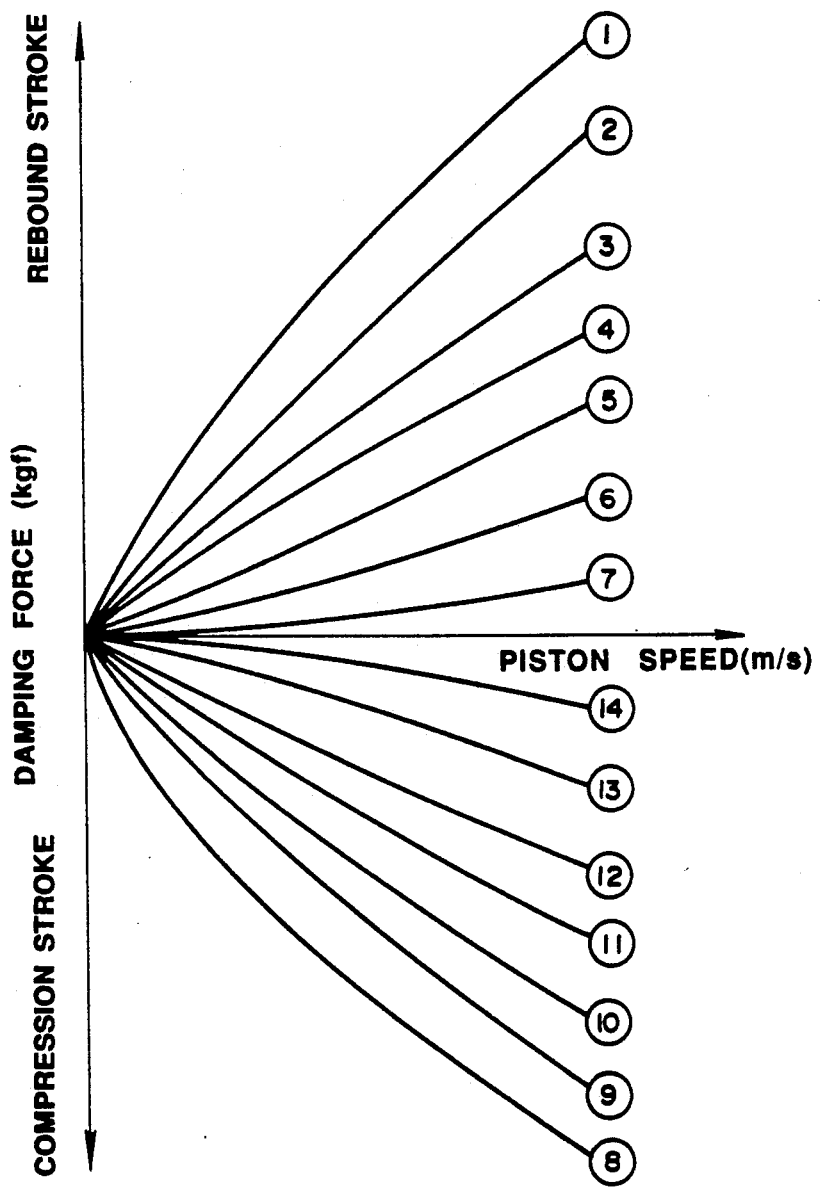
FIG. 8 illustrates a famility of damping characteristic curves provided by the embodiment according to the present invention.

FIG. 8 show a family of damping characteristic curves provided according to the present invention by varying angular position of the flow restrictor 28. As will be appreciated from these characteristic curves, there are no inflection points in damping characteristics.

What is claimed is:

1. In a variable damping force shock absorber:
a sleeve having an axial bore;
a valve body fixedly coupled with said sleeve, said valve body being formed with an outer groove, an inner groove surrounded by said outer groove, an outer valve seat disposed adjacent the outer periphery of said outer groove, an inner valve seat disposed between said outer and inner grooves;
a damping valve element cooperating with said outer and inner valve seats to cover said outer and inner grooves;
said sleeve having a first radial port communication with said inner groove, sa second radial port communication with said outer groove, a third radial port communicating with said inner groove;
an adjustable flow restrictor moveable disposed in said axial bore of said sleeve and having a first passage and a second passage, said adjustable flow restrictor having a first position wherein said first and second passages are out of communication with said first, second and third radial ports, thereby to cover said first, second and third radial ports, a second position wherein said first passage establishes a fluid communication between said second and third radial ports, thereby to establish fluid communication between said inner groove and said outer groove, and a third position wherein said second passage communicates with said first radial port and said first passage establishes said fluid communication between said second and third radial ports.

* * * * *